(12) United States Patent
Gou et al.

(10) Patent No.: US 10,225,744 B2
(45) Date of Patent: Mar. 5, 2019

(54) METHOD AND APPARATUS FOR SENDING INFORMATION

(71) Applicant: ZTE CORPORATION, Shenzhen, Guangdong Province (CN)

(72) Inventors: Wei Gou, Shenzhen (CN); Xiaogang Han, Shenzhen (CN); Focai Peng, Shenzhen (CN); Yajun Zhao, Shenzhen (CN); Feng Bi, Shenzhen (CN); Shuqiang Xia, Shenzhen (CN)

(73) Assignee: XI'AN ZHONGXING NEW SOFTWARE CO., LTD., Xi'an, Shaanxi (CN)

( * ) Notice: Subject to any disclaimer, the term of this patent is extended or adjusted under 35 U.S.C. 154(b) by 0 days.

(21) Appl. No.: 15/587,823

(22) Filed: May 5, 2017

(65) Prior Publication Data

US 2017/0245156 A1    Aug. 24, 2017

Related U.S. Application Data

(62) Division of application No. 15/314,512, filed as application No. PCT/CN2015/077867 on Apr. 29, 2015.

(30) Foreign Application Priority Data

May 30, 2014    (CN) .......................... 2014 1 0241029

(51) Int. Cl.
*H04W 72/00*    (2009.01)
*H04W 16/14*    (2009.01)
(Continued)

(52) U.S. Cl.
CPC ............. *H04W 16/14* (2013.01); *H04L 5/005* (2013.01); *H04L 5/0007* (2013.01);
(Continued)

(58) Field of Classification Search
CPC ............... H04W 16/14; H04W 72/042; H04W 72/0453; H04W 72/1289
See application file for complete search history.

(56) References Cited

U.S. PATENT DOCUMENTS

2011/0255486 A1    10/2011    Luo et al.
2013/0201884 A1    8/2013    Freda et al.
(Continued)

FOREIGN PATENT DOCUMENTS

CN    102474727 A    5/2012
CN    102833796 A    12/2012
(Continued)

OTHER PUBLICATIONS

Qualcomm et al., On the primacy of licensed spectrum in relation to the proposal of using LTE for a licensed-assisted access to unlicensed spectrum, 3GPP TSG-RAN #63 Mar. 3-6, 2014 Fukuoka, Japan. RP-140057.

*Primary Examiner* — Khalid Shaheed
(74) *Attorney, Agent, or Firm* — Ling Wu; Stephen Yang; Ling and Yang Intellectual Property

(57) ABSTRACT

A method and apparatus for sending information are provided, herein the method for sending information includes: the sending end using a physical control channel (PDCCH) or an enhanced physical control channel (ePDCCH) or downlink control information (DCI) transmitted in the agreed resources to describe the information about time that the unlicensed carriers are occupied; the sending end sending the DCI information through licensed carriers or the unlicensed carriers; herein, the information about time includes: a starting subframe occupying an unlicensed carrier and the number of subframes that are continuously occupied starting from the starting subframe. Through the present disclosure, how to enable base stations to mutually inform about an occupation situation of the unlicensed
(Continued)

carrier in the related art is achieved, the coordination and utilization of the unlicensed carriers in a wireless communication system are simplified the utilization rate of the unlicensed carriers is improved.

13 Claims, 3 Drawing Sheets

(51) Int. Cl.
    *H04L 5/00*     (2006.01)
    *H04L 27/26*     (2006.01)
    *H04W 72/12*     (2009.01)
    *H04W 72/04*     (2009.01)

(52) U.S. Cl.
    CPC ........ *H04L 5/0098* (2013.01); *H04L 27/2601* (2013.01); *H04W 72/042* (2013.01); *H04W 72/0413* (2013.01); *H04W 72/0453* (2013.01); *H04W 72/1205* (2013.01); *H04W 72/1284* (2013.01); *H04W 72/1289* (2013.01); *H04W 72/04* (2013.01)

(56) References Cited

U.S. PATENT DOCUMENTS

| | | | |
|---|---|---|---|
| 2014/0003387 A1 | 1/2014 | Lee et al. | |
| 2014/0031054 A1* | 1/2014 | Zou | H04W 16/14 455/452.2 |
| 2014/0036818 A1* | 2/2014 | Koskela | H04W 72/042 370/329 |
| 2014/0036853 A1* | 2/2014 | Kim | H04W 16/14 370/329 |
| 2014/0036881 A1 | 2/2014 | Kim et al. | |
| 2014/0112289 A1* | 4/2014 | Kim | H04W 16/14 370/329 |

FOREIGN PATENT DOCUMENTS

| | | |
|---|---|---|
| CN | 102843696 A | 12/2012 |
| CN | 103765824 A | 4/2014 |
| JP | 2014500685 A | 1/2014 |
| JP | 2014-508468 A | 4/2014 |
| WO | 2013075314 A1 | 5/2013 |
| WO | 2013116662 A1 | 8/2013 |
| WO | 2013131257 A1 | 9/2013 |
| WO | 2013131268 A1 | 9/2013 |

* cited by examiner

METHOD AND APPARATUS FOR SENDING INFORMATION

TECHNICAL FIELD

The present disclosure relates to the field of communications, and in particular, to a method and apparatus for transmitting inter-domain fault information.

BACKGROUND OF THE RELATED ART

Up to now, as everybody knows, LTE is deployed in licensed carriers for operation. However, with the evolution of LTE, in the second half year of 2013, some companies (e.g., America Qualcomm Incorporated) put forward a suggestion of studying a subject of deploying LTE on unlicensed carriers. However, up to now, the suggestion has not been accepted by LTE and no project has been set up.

A reason, provided by Qualcomm Incorporated, for setting up a project is mainly that, with the quick increase of data service, in the near future, licensed spectrums cannot bear such huge data volume. Therefore, it is suggested to deploy LTE in unlicensed spectrums, so as to share data flow in licensed carriers through the unlicensed spectrums.

Moreover, the unlicensed spectrums also have many advantages. For example, the unlicensed spectrums have the following features and advantages:

1. free/low expense (the unlicensed spectrums do not need to be purchased and the spectrum resources are zero-cost);
2. low admission requirement and low cost (individuals and enterprises may participate in deployment and devices of device providers may be randomly selected);
3. resource sharing (when a plurality of different systems operate therein or different operators of the same system operate therein, some resource sharing modes may be considered to improve spectrum efficiency);
4. numerous radio access technologies (it is difficult to realize collaboration across different communication standards and network topologies are diversified);
5. numerous radio access websites (the number of users is great, the collaboration difficulty is great and the centralized management overhead is great);
6. numerous applications (according to materials, multiple services such as Machine to Machine (M2) and Vehicle to Vehicle (V2V) are mentioned to be capable of operating therein).

The above-mentioned basic features decide that the unlicensed spectrums may be an important evolution direction of radio communication systems, but many problems exist at the same time. For example, various systems exist in the unlicensed spectrums, it is difficult to realize coordination and the interference is serious.

If an LTE system operates on an unlicensed carrier, there is a problem how an LTE base station informs other nearby base stations when the LTE base station seizes an unlicensed carrier resource.

Aiming at the problem of how to enable base stations to mutually inform about an occupation situation of the unlicensed carrier in the related art, up to now no effective solution has already been put forward.

SUMMARY

The following is an overview of the topics that are described in detail in this article. This summary is not intended to limit the scope of the claims.

An embodiment of the present disclosure provides a method and apparatus for sending information, capable of realizing how the base stations can notify each other of the occupancy of the unlicensed carrier.

The embodiment of the present disclosure further provides a method for sending information, comprising:

a sending end uses a physical control channel PDCCH or an enhanced physical control channel, an enhanced physical control channel ePDCCH, or downlink control information DCI transmitted in agreed resources to describe information about time that unlicensed carriers are occupied;

the sending end sending the DCI information through licensed carriers or the unlicensed carriers, herein the information about time comprises: a starting subframe and the number of subframes which are continuously occupied starting from the starting subframe.

Alternatively, the sending end using the DCI information to describe the information about time that the unlicensed carriers are occupied comprises at least one of the following:

the sending end using the DCI information to describe information about time that the unlicensed carriers are occupied by the sending end; and the sending end using the DCI information to describe information about time that the unlicensed carriers are occupied by other sending ends;

the information about time comprising: under a situation that an uplink and a downlink share the same one carrier, downlink sending time occupied by the sending end and uplink receiving time of the sending end; or the information about time comprising the downlink sending time occupied by the sending end only; or the information about time comprising the downlink sending time occupied by the sending end and partial uplink receiving time of the sending end.

Alternatively, the sending end using the DCI information to describe information about time that the unlicensed carriers are occupied comprises parts of or all of the following:

the sending end using a PDCCH in first one, two, three or four OFDM symbols of a subframe to bear the information about time;

the sending end using a PDCCH in an OFDM symbol of a second slot of a subframe to bear the information about time; and the sending end using a preset resource location of a subframe to bear the information about time.

Alternatively, the sending end using the DCI information to describe information about time that the unlicensed carriers are occupied comprises:

the sending end indicating, in a current subframe, whether a next subframe will be used by the sending end.

Alternatively, the sending end using the DCI information to describe information about time that the unlicensed carriers are occupied comprises:

the sending end using the DCI information according to a preset DCI format to bear the information about time that the unlicensed carrier is occupied;

the sending end using an agreed Radio Network Temporary Identifier, RNTI, to scramble the DCI information, and sending the DCI information in a common search space of a PDCCH/ePDCCH or in agreed resources;

the preset DCI format includes parts of or all of the following: DCI format 3, 3A, 1C and DCI format corresponding to a unique bit number.

Alternatively, the information about time is described by taking a subframe as a unit, or described by taking an OFDM symbol as a unit or described by taking a slot as a unit;

the information about time describes subframes, OFDM symbols, or timeslots that will be occupied by the sender or other senders.

Alternatively, the information about time describing a subframe that will be occupied by the sending end or other sending ends comprises parts of or all of the following:

the information about time describing that a plurality of continuous subframes starting from a current subframe are occupied;

the information about time describing patterns of subframes which will be occupied.

Alternatively, the sending end using the DCI information to describe information about time that the unlicensed carriers are occupied comprises parts of or all of the following:

the sending end sending the DCI information describing the information about time in a first occupied subframe.

the DCI information describing information about current remaining occupied subframes.

the sending end indicating, in a current subframe, whether a next subframe will be used by the sending end.

the sending end sending the DCI information describing the information about time in a first occupied subframe.

the sending end using all bits or part of bits in the DCI/UCI to describe the information about time that the unlicensed carriers are occupied.

Alternatively, the information about time that the unlicensed carrier is occupied comprises a length of time that the unlicensed carrier is seized by the sending end in order to execute data transmission for one time.

In another aspect, the embodiment of the present disclosure further provides an apparatus for sending information, located at a send end, comprising:

a description module arranged to describe information about time that unlicensed carriers are occupied by using a physical control channel PDCCH or an enhanced physical control channel, an enhanced physical control channel ePDCCH, or downlink control information DCI transmitted in agreed resources;

a sending module arranged to send the DCI information through licensed carriers or the unlicensed carriers;

herein the information about time comprises: a starting subframe and the number of subframes which are continuously occupied starting from the starting subframe.

Alternatively, the description module using the DCI information to describe the information about time that the unlicensed carriers are occupied comprises at least one of the following:

using the DCI information to describe information about time that the unlicensed carriers are occupied by the sending end;

using the DCI information to describe information about time that the unlicensed carriers are occupied by other sending ends;

the information about time comprising: under a situation that an uplink and a downlink share the same one carrier, downlink sending time occupied by the sending end and uplink receiving time of the sending end; or the information about time comprising the downlink sending time occupied by the sending end only; or the information about time comprising the downlink sending time occupied by the sending end and parts of uplink receiving time of the sending end.

Alternatively, the description module using the DCI information to describe the information about time that the unlicensed carriers are occupied comprises parts of or all of the following:

using a PDCCH in first one or two or three or four OFDM symbols of a subframe to bear the information about time;

using a PDCCH in an OFDM symbol of a second slot of a subframe to bear the information about time; and using a preset resource location of a subframe to bear the information about time.

Alternatively, the description module using the DCI information to describe information about time that the unlicensed carrier is occupied comprises:

indicating, in a current subframe, whether a next subframe will be used by the sending end.

Alternatively, the description module using the DCI information to describe information about time that the unlicensed carriers are occupied comprises:

using the DCI information according to a preset DCI format to bear the information about time that the unlicensed carriers are occupied;

using an agreed Radio Network Temporary Identifier, RNTI, to scramble the DCI information, and sending the DCI information in a common search space of a PDCCH/ePDCCH or in agreed resources;

the preset DCI format includes parts of or all of the following: DCI format 3, 3A, 1C and DCI format corresponding to a unique bit number.

Alternatively, the information about time is described by taking a subframe as a unit, or described by taking an OFDM symbol as a unit or described by taking a slot as a unit;

the information about time describing a subframe, an OFDM symbol or a slot which will be occupied by the sending end or other sending ends.

Compared with the related art, the technical scheme of the present disclosure comprises the following steps: the sending end uses the physical control channel (PDCCH) or the enhanced physical control channel (ePDCCH) or the downlink control information (DCI) transmitted in the agreed resource to describe the time information of the occupied unlicensed carrier. The sending end transmits the DCI information through the licensed carrier or the unlicensed carrier, herein the information about time comprises: describing the starting subframe occupying the unlicensed carrier and the number of subframes that are continuously occupied from the starting subframe. Through the present disclosure, how to enable base stations to mutually inform about an occupation situation of the unlicensed carrier in the related art is achieved, the coordination and utilization of the unlicensed carriers in a wireless communication system are simplified the utilization rate of the unlicensed carriers is improved.

Other features and advantages of the present document are described in the following description, and become obvious in part from the description, or are understood by implementing the present document. The purpose and other advantages of the present document can be implemented and obtained by the structure which is specified in the description, claims and accompanying drawings.

BRIEF DESCRIPTION OF THE DRAWINGS

The accompanying drawings described herein are used to provide further understanding for the technical scheme of the present document and constitute a part of the present application, which are used to explain the technical scheme of the present document together with the embodiments of the present application, rather than constituting an inappropriate limitation on the technical scheme of the present application.

DETAILED DESCRIPTION

In order to make the object, technical solution and advantages of the present disclosure more clear, the embodiments of the present disclosure will be further described in detail in conjunction with the accompanying drawings. It should be illustrated that, under the situation of no conflict, the embodiments and the features in the embodiments in the present application can be freely combined.

In addition, the steps shown in the flowchart of the drawings can be executed in a computer system of a set of computer executable instructions. Moreover, although logical orders are shown in the flowchart, in some situations, the steps shown or described in the flowchart can be executed in different orders other than the orders herein.

In consideration of the above-mentioned problem, in this embodiment, the signaling design and sending method for informing is provided.

Figure 1:
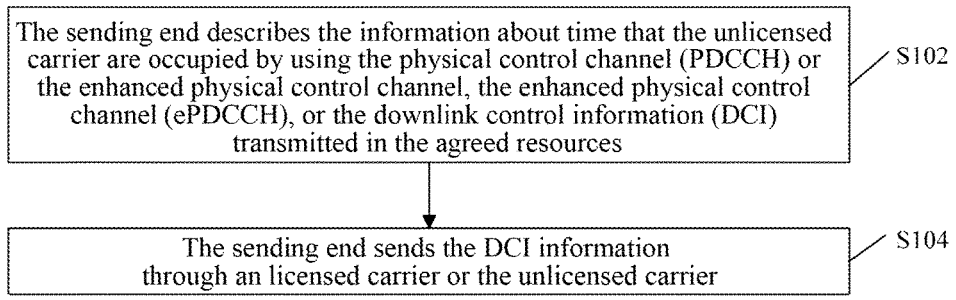
FIG. 1 illustrates a flowchart of a method for sending information according to the embodiment of the present disclosure.

In this embodiment, a method for sending information is provided. FIG. 1 illustrates a flowchart of a method for sending information according to the embodiment of the present disclosure. As illustrated in FIG. 1, the method includes the following steps:

In step S102, the sending end describes the information about time that the unlicensed carriers are occupied by using the physical control channel (PDCCH) or the enhanced physical control channel, the enhanced physical control channel (ePDCCH), or the downlink control information (DCI) transmitted in the agreed resources;

herein the information about time comprises: information about time comprises: a starting subframe and the number of subframes which are continuously occupied starting from the starting subframe.

In step S102, a sending end uses Downlink Control Information (DCI) to describe information about time that an unlicensed carrier is occupied. According to the control of unlicensed carriers in Europe, for example, EN 301893 of ETSI, when the sending end uses an unlicensed carrier to transmit data at each time, the channel busy/idle detection is performed, and when the channel is idle, the channel can be used by the sending end and maximum time that the channel can be used at each time is given. Information about occupied time refers to information describing length of time that the unlicensed carrier is seized by the sending end in order to execute data transmission for one time. Herein, all bits or part of bits in DCI may be used to describe the information about time that the unlicensed carrier is occupied. When part of bits are used to describe the information about time that the unlicensed carrier is occupied, remaining bits are reserved for other purposes or are used as reserved bits to keep a total bit number for DCI formats unchanged.

In step S104, the sending end sends the DCI information through licensed carriers or the unlicensed carriers.

In this embodiment, through the above-mentioned steps, the sending end describes the information about time that the unlicensed carrier is occupied through DCI information (which may also be the signaling) and sends the DCI information through the licensed carrier or the unlicensed carrier. Thus the share of the information about time that the unlicensed carrier is occupied by the sending end is realized, the problem of how to enable base stations to mutually inform about an occupation situation of the unlicensed carrier in the related art is solved, the coordination and utilization of the unlicensed carriers in a wireless communication system are facilitated and the utilization rate of the unlicensed carriers is improved.

Alternatively, the sending end using the DCI information to describe information about time that the unlicensed carrier is occupied comprises at least one of the following:

the sending end using the DCI information to describe information about time that the unlicensed carrier is occupied by the sending end; and the sending end using the DCI/UCI information to describe information about time that the unlicensed carrier is occupied by other sending ends.

Alternatively, the sending end using the DCI information to describe information about time that the unlicensed carrier is occupied comprises part of or all of the following:

the sending end using a PDCCH in first one or two or three or four OFDM symbols of a subframe to bear the information about time;

the sending end using a PDCCH in an OFDM symbol of a second slot of a subframe to bear the information about time; and the sending end using a preset resource location of a subframe to bear the information about time.

Alternatively, the sending end using the DCI information to describe information about time that the unlicensed carrier is occupied comprises:

the sending end indicating, in a current subframe, whether a next subframe will be used by the sending end.

Alternatively, the sending end using the DCI information to describe information about time that the unlicensed carrier is occupied comprises:

the sending end using the DCI information according to a preset DCI format to bear the information about time that the unlicensed carrier is occupied;

the sending end using an agreed Radio Network Temporary Identifier, RNTI, to scramble the DCI information, and sending the DCI information in a common search space of a PDCCH/ePDCCH or in the agreed resources;

the preset DCI format includes part of or all of the following: DCI format 3, 3A, 1C and DCI format corresponding to a unique bit number.

Alternatively, the information about time is described by taking a subframe as a unit, or described by taking an OFDM symbol as a unit or described by taking a slot as a unit;

the information about time describes a subframe, an OFDM symbol or a slot that will be occupied by the sending end or other sending ends.

Alternatively, the information about time describing a subframe, an OFDM symbol or a slot that will be occupied by the sending end or other sending ends comprises part of or all of the following:

the information about time describing that a plurality of continuous subframes starting from a current subframe are occupied;

the information about time describing patterns of subframes which will be occupied.

Alternatively, the sending end using the DCI information to describe information about time that the unlicensed carrier is occupied comprises part of or all of the following:

the sending end sending the DCI information describing the information about time in a first occupied subframe.

the DCI information describing information about current remaining occupied subframes.

the sending end indicating, in a current subframe, whether a next subframe will be used by the sending end.

the sending end sending the DCI information describing the information about time in a first occupied subframe.

The sending end uses all bits or part of bits in the DCI to describe the information about time that the unlicensed carrier is occupied.

Alternatively, the information about time that the unlicensed carrier is occupied comprises a length of time that the unlicensed carrier is seized by the sending end in order to execute data transmission for one time.

Alternatively, if the sending end is a base station, the base station may use the DCI information to describe information about time that the unlicensed carrier is occupied by the base station or other base stations; or if the sending end is User Equipment (UE) or a small cell subordinate to the base station, the UE or the small cell may use the UCI/DCI information (may also use other signaling such as Radio Resource Control (RRC) signaling) to describe the information about time, which is learned by the UE or the small cell, that the unlicensed carrier is occupied by other sending ends, and sends the information about time to the base station to which the UE or the small cell belongs.

Alternatively, under a situation that the sending end is a base station, the sending end may simultaneously send a Primary Synchronization Signal (PSS)/Secondary Synchronization Signal (SSS) and a Physical Broadcast Channel (PBCH), and a demodulation signal Cell-specific Reference Signal (CRS) or a Demodulation Reference Signal (DMRS) needed by a Physical Control Format Indicator Channel (PCFICH) and a Physical Downlink Control Channel (PDCCH)/an Enhanced PDCCH (ePDCCH) in the unlicensed carrier; or the sending end ensures that the unlicensed carrier is strictly aligned to the licensed carrier of the sending end and then the sending end sends the DCI information in the unlicensed carrier according to timing of the licensed carrier of the sending end.

Alternatively, if there are a plurality of licensed carriers of a receiving end, the sending end in the unlicensed carrier may be strictly aligned to timing of at least one of the plurality of licensed carriers. Herein, as an alternative implementation mode, the sending end in the unlicensed carrier may be strictly aligned to timing of a carrier of a minimum frequency point possessed by the sending end.

Alternatively, the sending end may send the DCI information in a downlink carrier of the licensed carrier or the unlicensed carrier.

Alternatively, under a situation that an uplink and a downlink share the same one carrier (e.g., in case of Time Division Duplexing (TDD) LTE), when the sending end uses the DCI to describe the information about occupied time, the information about time includes downlink sending time occupied by the sending end and uplink receiving time of the sending end; or the information about time includes the downlink sending time occupied by the sending end and does not include the uplink receiving time of the sending end (for the uplink receiving time, the corresponding sending end sends the information about occupied time); or the information about time includes the downlink sending time occupied by the sending end and partial uplink receiving time of the sending end (for other uplink receiving time, the corresponding sending end sends the information about occupied time). Moreover, generally a fixed frame structure is defined in an LTE TDD system. For example, frame length is 10 ms and includes 10 subframes, herein downlink subframes and uplink frames are agreed, different uplink-downlink configurations are divided according to data of the uplink and downlink subframes and different locations in frames, and each configuration proportion has an agreed serial number. Therefore, for the LTE TDD system, the information about occupied time may also be information describing the serial number of the agreed uplink-downlink configuration proportion (or information describing the uplink-downlink configuration proportion). According to the serial number information or the configuration proportion information, in combination with the agreed standard protocol, the receiving end may learn about numbers and corresponding locations of uplink subframes and downlink subframes specifically occupied by the sending end.

Alternatively, under a situation that the sending end is a base station, the base station may use a PDCCH in first one, two, three or four Orthogonal Frequency Division Multiplexing (OFDM) symbols of a subframe to bear the information about time; or the base station may also use a PDCCH in an OFDM symbol of a second slot of a subframe to bear the information about time; or the base station may also use a preset resource location of a subframe to bear the information about time.

Alternatively, the sending end may indicate a location for bearing the information about time through a PCFICH channel.

Alternatively, if the sending end is a base station, the sending end may use an ePDCCH channel in a Physical Resource Block (PRB) at an agreed carrier location to send the DCI.

Alternatively, the sending end indicating, in a current subframe, whether a next subframe will be used by the sending end. Alternatively, the sending end may indicate, in a current subframe, whether a next subframe will be used by the sending end, or indicate that a plurality of continuous subframes are occupied in an initial first subframe. Herein, incomplete subframes are included.

Alternatively, the sending end may use the DCI information according to a preset DCI format to bear the information about time that the unlicensed carrier is occupied. Herein, as an alternative implementation mode, the preset DCI format includes but not limited to at least one of the following: DCI format 3, 3A, 1C and DCI format corresponding to a unique bit number.

Alternatively, the sending end may use an agreed Radio Network Temporary Identifier (RNTI) to scramble the DCI information, and send the information about time that the unlicensed carrier is occupied in a common search space of a PDCCH/ePDCCH or in an agreed resource. Alternatively, for DCI bits containing the information about time that the unlicensed carrier is occupied, the sending end adds a Cyclic Redundancy Check (CRS) bit and uses an agreed RNTI to scramble the CRC bit.

Alternatively, the information about time may be described by taking a subframe as a unit, or may be described by taking an OFDM symbol as a unit or may also be described by taking a slot as a unit. Herein, under the situation that the description is performed by taking the subframe, OFDM or slot as the unit, the information about time may be used to describe a subframe, an OFDM symbol or a slot which will be occupied by the sending end or other sending ends.

Alternatively, in the direction of time, the sending end, in a first occupied subframe, uses a bit in an agreed DCI format or UCI format to describe the information about time occupied by the sending end or other sending ends, including but not limited to at least one of the following: the information about time describes that a plurality of continuous subframes starting from a current subframe are occupied; the information about time describes the number of subframes which are continuously occupied starting from a certain frame; and the information about time describes the patterns of subframes, which will be occupied, in subframes. The information about time may also further include information about frequency (e.g., Physical Resource Block (PRB) information, subcarrier information and bandwidth information) specifically occupied in the unlicensed carrier occupied by the sending end. (In a carrier direction, a first subframe occupied in the unlicensed carrier may be used and a subframe of an licensed carrier, in time, aligned thereto may also be used.)

Alternatively, the information about time describing the pattern of the subframes which will be occupied in subframes includes: if a maximum number of subframes which are allowable to be occupied at one time is N and N is less than or equal to the bit number of DCI, first N bits in DCI are used to describe subframes occupied by the sending end or other sending ends in a bitmap mode.

Alternatively, the sending end may send the DCI information describing the information about time in each occupied subframe. As an alternative implementation mode, the DCI information may only describe information about current remaining occupied subframes. For example, if five subframes in addition to the current subframe need to be occupied, five subframes are displayed in the current subframe, four subframes may be displayed in a next subframe, and so on.

Or, as another alternative implementation mode, the sending end may also send the DCI information describing the information about time only in a first occupied subframe. Alternatively, contents of the DCI information may include but not limited to at least one of the following: a bit indicating a mode of describing the information about time that the unlicensed carrier is occupied in the DCI information; and a bit describing the information about time that the unlicensed carrier is occupied.

Alternatively, contents of the DCI information may further include but not limited to at least one of the following: a bit indicating a resource seizure mode described in the DCI, herein the resource seizure mode includes a bitmap mode, a continuous seizure mode, etc.; and a bit indicating a resource seizure moment described in the DCI, herein the resource seizure moment includes starting from a current subframe or starting from a next subframe.

Alternatively, the sending end may also indicate the resource seizure mode and/or resource seizure moment not in the bit content of the DCI information, e.g., may use different common RNTIs to indicate a location of a bit describing a resource seizure mode in the DCI; and/or use different common RNTIs to indicate a location of a bit describing a resource seizure moment in the DCI.

Alternatively, the sending end may include a base station, a relay station or a UE.

Figure 2:
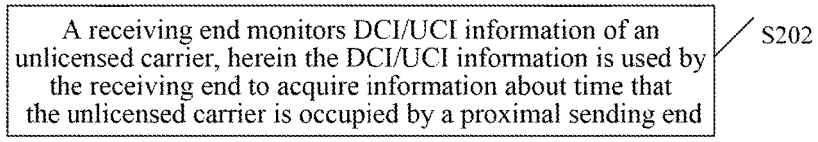
FIG. 2 illustrates a flowchart of a method for receiving information according to the embodiment of the present disclosure.

In this embodiment, a method for receiving information is further provided. FIG. 2 illustrates a flowchart of a method for receiving information according to the embodiment of the present disclosure. As illustrated in FIG. 2, the method includes the following steps:

In step S202, a receiving end monitors DCI/UCI information of an unlicensed carrier, herein the DCI/UCI information is used by the receiving end to acquire information about time that the unlicensed carrier is occupied by a proximal sending end.

In this embodiment, through the above-mentioned step, the receiving end monitors the DCI/UCI information to obtain the information about time that the unlicensed carrier is occupied by the proximal sending end, and the receiving end realizes the acquisition of the information about time that the unlicensed carrier is occupied, thus the use policy of the unlicensed carrier can be determined according to the information about time, the problem of how to enable base stations to mutually inform about an occupation situation of the unlicensed carrier in the related art is solved, the coordination and utilization of the unlicensed carriers in a wireless communication system are facilitated and the utilization rate of the unlicensed carriers is improved.

Alternatively, a method that the receiving end determines the use policy of the unlicensed carrier according to the information about time may include but not limited to at least one of the following operations: the receiving end determines whether to continuously occupy the unlicensed carrier according to the information about time; the receiving end determines a scheduling policy of subordinate UE according to the information about time; when the receiving end needs to use the unlicensed carrier, the receiving end determines that the unlicensed carrier is not used by other base stations according to the information about time, or the unlicensed carrier is used by other base stations but the use of the unlicensed carrier by the receiving end is not influenced; and under a situation that the receiving end receives information about time, forwarded by a subordinate UE or a small cell, that the unlicensed carrier is occupied by a proximal base station, the receiving end determines whether a beamforming technology is used for the UE or the small cell to transmit data according to the information about time.

Alternatively, a method that the receiving end monitors the DCI/UCI information may include the following operations:

under a situation that the receiving end is a base station, the base station respectively performs synchronization at different licensed frequency points and acquires a cell identity (cell ID) of the sending end which sends the DCI; and then it receives a PCFICH and a PDCCH according to the cell identity, or does not receive the PCFICH but directly receives an ePDCCH to acquire the DCI; or under a situation that the receiving end is UE, the UE respectively performs synchronization at different licensed frequency points and acquiring a cell identity (cell ID) of the sending end which sends the DCI; and then it receives a PCFICH and a PDCCH according to the cell identity, or does not receive the PCFICH but directly receives an ePDCCH to acquire the DCI, and informs a base station, to which the UE belongs, about the DCI through the UCI or RRC signaling.

Alternatively, a method that the receiving end monitors the DCI information may include the following operations:

the receiving end receives a PSS/SSS and a PBCH of a sending-end base station, and then it receives a PCFICH and a PDCCH/ePDCCH; or the receiving end is synchronized with an licensed carrier, and then the receiving end determines a location of the DCI sent in the unlicensed carrier according to timing of the licensed carrier; and the receiving end receives the DCI information according to the location of the DCI.

Alternatively, corresponding to the description mode of the sending end, a method that the receiving end monitors the DCI/UCI information may include but not limited to at least one of the following operations: the receiving end receives the information about time through a PDCCH in first one, two, three or four OFDM symbols of a subframe; the receiving end receives the information about time through a PDCCH in an OFDM symbol of a second slot of a subframe; and the receiving end receives the information about time through a PDCCH/ePDCCH at a preset resource location of a subframe.

Alternatively, the receiving end may receive the information about time on a PDCCH/ePDCCH of the unlicensed carrier or on an agreed resource according to an agreed DCI format. Herein, as an alternative implementation mode, the receiving end may determine information about time that the unlicensed carrier is occupied by other base stations according to a bit in the DCI; or determine a location and/or meaning of a bit describing the information about time in the DCI according to a bit in the DCI.

Alternatively, if the receiving end receives the DCI/UCI information in an uplink carrier of the unlicensed carrier, the receiving end may determine that the DCI/UCI information describes information about time that the unlicensed carrier is occupied by other base stations proximal to the sending end.

Alternatively, the receiving end may determine an occupation situation of the unlicensed carrier in a mode of monitoring the DCI/UCI information subframe by subframe in the unlicensed carrier; or after other base stations occupy a first subframe of the unlicensed carrier to receive the DCI/UCI information to obtain the information about time that the unlicensed carrier is occupied, the receiving end does not monitor the DCI information until occupation of the unlicensed carrier is ended.

Alternatively, the receiving end may include a base station, a relay station and a UE.

Corresponding to the method for sending information, in this embodiment, an apparatus for sending information located at a sending end is provided. The apparatus is arranged to implement the above-mentioned embodiment and the alternative implementation mode, which have already been described and thus are not repetitively described here. As used below, the term "module" can implement a combination of software and/or hardware with predetermined functions. Although the apparatus described by the following embodiments is alternatively implemented by software, hardware or a combination of software and hardware may also be possible and conceived.

Figure 3:
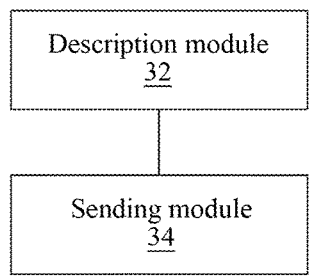
FIG. 3 illustrates a structural diagram of an apparatus for sending information according to the embodiment of the present disclosure.

FIG. 3 illustrates a structural diagram of an apparatus for sending information according to the embodiment of the present disclosure. As illustrated in FIG. 3, the apparatus includes a description module 32 and a sending module 34. The modules will be described below:

a description module 32 arranged to describe the information about time that the unlicensed carriers are occupied by using the physical control channel PDCCH or the enhanced physical control channel, the enhanced physical control channel ePDCCH, or the downlink control information DCI transmitted in the agreed resources;

a sending module arranged to send the DCI information through licensed carriers or the unlicensed carriers;

herein the information about time comprises: a starting subframe and the number of subframes which are continuously occupied starting from the starting subframe.

Alternatively, the description module using the DCI information to describe the information about time that the unlicensed carrier is occupied comprises one of the following:

using the DCI information to describe information about time that the unlicensed carrier is occupied by the sending end; and using the DCI information to describe information about time that the unlicensed carrier is occupied by other sending ends;

the information about time comprising: under a situation that an uplink and a downlink share the same one carrier, downlink sending time occupied by the sending end and uplink receiving time of the sending end; or the information about time comprising the downlink sending time occupied by the sending end only; or the information about time comprising the downlink sending time occupied by the sending end and partial uplink receiving time of the sending end.

Alternatively, the description module using the DCI information to describe the information about time that the unlicensed carrier is occupied comprises part of or all of the following:

using a PDCCH in first one, two, three or four OFDM symbols of a subframe to bear the information about time;

using a PDCCH in an OFDM symbol of a second slot of a subframe to bear the information about time; and using a preset resource location of a subframe to bear the information about time.

Alternatively, the description module using the DCI information to describe information about time that the unlicensed carrier is occupied comprises:

indicating, in a current subframe, whether a next subframe will be used by the sending end.

Alternatively, the description module using the DCI information to describe information about time that the unlicensed carrier is occupied comprises:

using the DCI information according to a preset DCI format to bear the information about time that the unlicensed carrier is occupied;

using an agreed Radio Network Temporary Identifier, RNTI, to scramble the DCI information, and sending the DCI information in a common search space of a PDCCH/ePDCCH or in an agreed resource;

the preset DCI format includes part of or all of the following: DCI format 3, 3A, 1C and DCI format corresponding to a unique bit number.

Alternatively, the information about time is described by taking a subframe as a unit, or described by taking an OFDM symbol as a unit or described by taking a slot as a unit;

the information about time describing a subframe, an OFDM symbol or a slot which will be occupied by the sending end or other sending ends.

Figure 4:
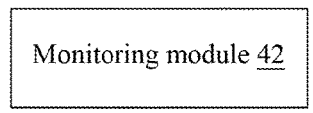
FIG. 4 illustrates a structural diagram of an apparatus for receiving information according to the embodiment of the present disclosure.

Corresponding to the method for receiving information, in this embodiment, an apparatus for receiving information located at a receiving end is further provided. FIG. 4 illustrates a structural diagram of an apparatus for receiving information according to the embodiment of the present disclosure. As illustrated in FIG. 4, the apparatus includes a monitoring module 42. The module will be described below in detail.

The monitoring module 42 is arranged to monitor DCI/UCI information of an unlicensed carrier, herein the DCI/UCI information is used by the receiving end to acquire information about time that the unlicensed carrier is occupied by a proximal sending end.

Alternatively, the monitoring module includes: an acquisition unit 422 arranged to, under a situation that the receiving end is a base station, respectively perform synchronization at different licensed frequency points and acquire a cell identity (cell ID) of the sending end which sends the DCI; and then receive a PCFICH and a PDCCH according to the cell identity, or not receive the PCFICH but directly receive an ePDCCH to acquire the DCI; or under a situation that the receiving end is UE, respectively perform synchronization at different licensed frequency points and acquire a cell identity (cell ID) of the sending end which sends the DCI; and then receive a PCFICH and a PDCCH according to the cell identity, or not receive the PCFICH but directly receive an ePDCCH to acquire the DCI, and inform a base station, to which the UE belongs, about the DCI through UCI or RRC signaling.

Figure 5:
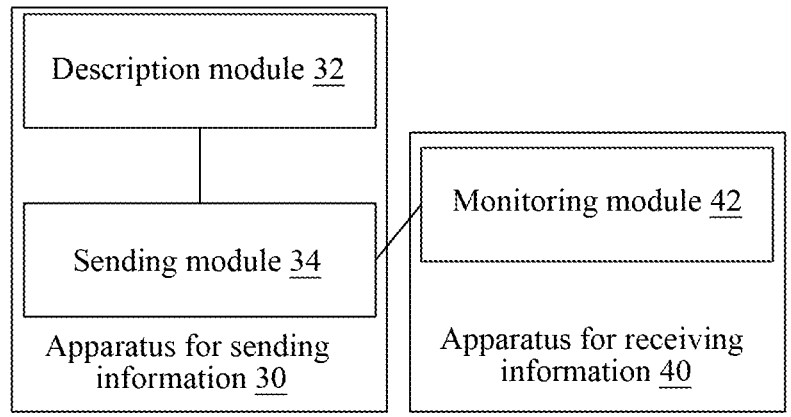
FIG. 5 illustrates a structural diagram of a system for sending information according to the embodiment of the present disclosure.

In this embodiment, a system for sending information is further provided. FIG. 5 illustrates a structural diagram of a system for sending information according to the embodiment of the present disclosure. As illustrated in FIG. 5, the system includes the apparatus for sending information 30 illustrated in FIG. 3 and further includes the apparatus for receiving information 40 as illustrated in FIG. 4.

It is explained by combining with the alternative embodiment hereinafter, and the following alternative embodiment combines the above-mentioned embodiment and its alternative embodiments.

In the following alternative embodiments, a carrier resource occupation information design and sending solution of an unlicensed carrier seized/occupied by a base station is provided. A basic idea is to use DCI/UCI to describe information about time that the unlicensed carrier is occupied by the base station.

The solution will be described below in detail from two aspects, i.e., sending end and receiving end.

Figure 6:
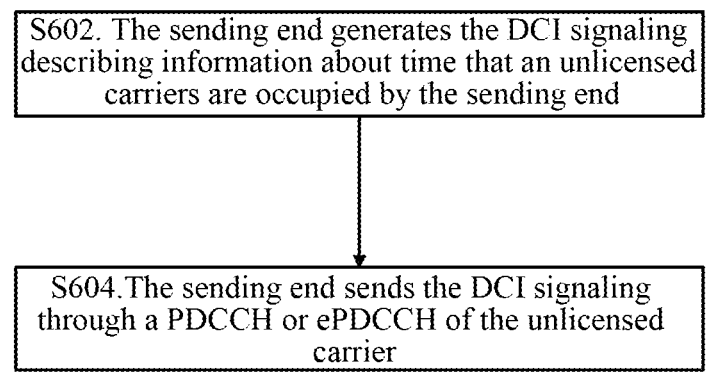
FIG. 6 illustrates a flowchart 1 of a sending end according to the alternative embodiment of the present disclosure.

Specific solution of sending end: a sending end, in a subframe OFDM symbol, uses DCI to send information about time that an unlicensed carrier is occupied by the sending end or other sending ends. FIG. 6 illustrates a flowchart 1 of a sending end according to the alternative embodiment of the present disclosure. As illustrated in FIG. 6, the process of the sending end includes:

In step S602, a sending end generates the DCI signaling describing information about time that an unlicensed carrier is occupied by the sending end.

In step S604, the sending end sends the DCI signaling through a PDCCH or ePDCCH of the unlicensed carrier.

Figure 7:
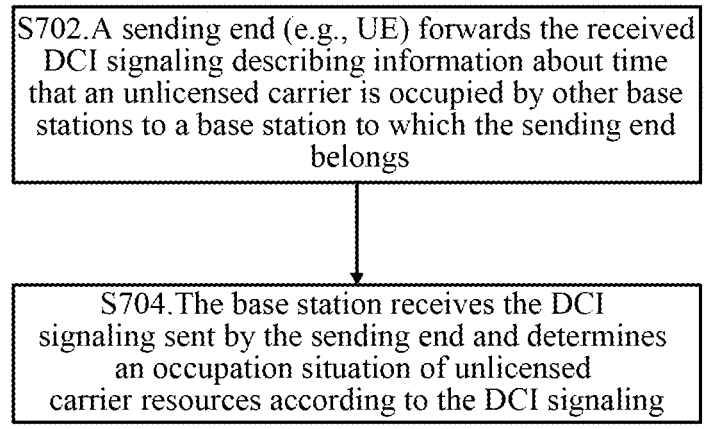
FIG. 7 illustrates a flowchart 2 of a sending end according to the alternative embodiment of the present disclosure.

Alternatively, FIG. 7 illustrates a flowchart 2 of a sending end according to the alternative embodiment of the present disclosure. As illustrated in FIG. 7, under a situation that the sending end is UE or a small cell, the process of the sending end includes:

in step S702, a sending end (e.g., UE) forwards the received DCI signaling describing information about time that an unlicensed carrier is occupied by other base stations to a base station to which the sending end belongs.

In step S704, the base station receives the DCI signaling sent by the sending end and determines an occupation situation of an unlicensed carrier resource according to the DCI signaling.

Alternatively, a PDCCH in first one or two or three or four OFDM symbols of a subframe may be used to bear the information about time.

Alternatively, DCI is sent through a PDCCH or ePDCCH. For example, it is specified that middle two (or four or eight) PRBs are arranged to send an ePDCCH of a common channel (or arranged to send a channel occupation indication of LTE-U). An overhead is 2% (or 4% or 8%) and is less than the overhead for a PDCCH. Variable locations are more.

Alternatively, the information about time is sent in an OFDM symbol at a second slot in a subframe (the purpose of doing this is to ensure that a next subframe can be directly used by a base station which monitors as idle). Or it is sent in a pre-agreed resource location in the subframe.

Alternatively, the sending end uses the DCI to bear the information about time that the unlicensed carrier is occupied by the sending end or other sending ends, and sends the information about time. For example, if it is agreed to adopt a certain DCI format, a bit in the DCI format is used to describe information about a subframe that the unlicensed carrier is occupied by the sending end or other sending ends.

Alternatively, DCI format 3 may be used to describe the information about time.

Alternatively, an agreed RNTI is used for scrambling and sending in a common search area of a PDCCH.

Alternatively, the information about time describes subframes which will be occupied by the sending end or other sending ends by taking a subframe as a unit.

Alternatively, the described subframes are subframes within an agreed period of time.

Alternatively, the described subframes are the pattern of subframes in a time direction. The subframes corresponding to the pattern of subframes are occupied by the sending end or other sending ends.

Alternatively, the information about maximum occupied time may be 10 ms.

Alternatively, if a maximum number of subframes which are allowable to be occupied at one time is N and N is less than or equal to the bit number of DCI, first N bits in DCI may be used to describe subframes, in N ms, occupied by the sending end or other sending ends in a bitmap mode. Other bits are used as reserved bits and still need to be sent.

Alternatively, the sending end includes a base station and UE.

Alternatively, the sending end sends DCI describing the information about time in each subframe in occupied subframes.

Alternatively, if DCI is sent in each subframe, DCI describes that occupied subframe information is remaining and new subframe occupation information.

Alternatively, timing of the subframe used by the sending end to send DCI is the same as timing of a licensed carrier of the sending end.

Alternatively, the licensed carrier is alternatively a carrier of a minimum frequency point possessed by the sending end. (To select which licensed carrier is a problem, and if this problem is not solved, the unlicensed carrier possibly needs to send a synchronization signal and a PBCH thereof.)

Alternatively, the sending end sends it in a downlink carrier or an uplink carrier.

Alternatively, when the sending end uses the uplink carrier, it is sent in uplink resources allocated by a base station thereto.

Alternatively, bits in DCI are redefined to: indicate which mode is used to describe the information about time that the unlicensed carrier is occupied in the DCI; describe the information about time that the unlicensed carrier is occupied.

Alternatively, the sending end includes a base station, a relay station and UE.

Figure 8:
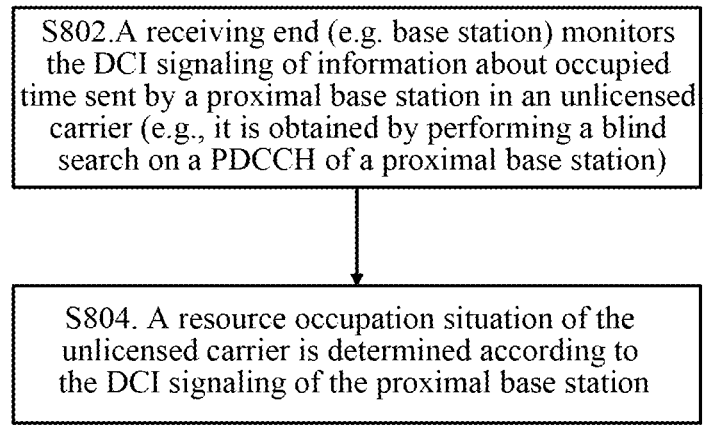
FIG. 8 illustrates a flowchart of a receiving end according to the alternative embodiment of the present disclosure.

Specific solution of receiving end: (basically reverse to the sending end) a receiving end receives information about time, described in a subframe OFDM symbol, that an unlicensed carrier is occupied by other base stations, and learns about time that the unlicensed carrier is occupied by other base stations according to the information about time. Herein, the information about time is born by DCI. FIG. 8 illustrates a flowchart of a receiving end according to the alternative embodiment of the present disclosure. As illustrated in FIG. 8, a process of a receiving end includes:

In step S802, a receiving end (e.g. base station) monitors the DCI signaling of information about occupied time sent by a proximal base station in an unlicensed carrier (e.g., it is obtained by performing a blind search on a PDCCH of a proximal base station).

In step S804, a resource occupation situation of the unlicensed carrier is determined according to the DCI signaling of the proximal base station.

Alternatively, the receiving end receiving the information about time that the unlicensed carriers are occupied through a PDCCH in first one, two, three or four OFDM symbols of a subframe. Or the DCI is received in an OFDM symbol of a second slot of a subframe, or in a pre-agreed resource location in a subframe.

Alternatively, the receiving end receives the information about time in a PDCCH according to an agreed DCI format.

Alternatively, the receiving end determines a pattern of subframes of the unlicensed carrier occupied by other base stations by using an agreed bitmap rule according to bits in DCI.

Alternatively, the receiving end receives the DCI information in an uplink carrier, and the receiving end considers that the DCI information describes the information about time that the unlicensed carrier is occupied by other base stations proximal to the sending end.

Alternatively, the receiving end needs to monitor the DCI information subframe by subframe and determine a busy/idle state of the unlicensed carrier.

Alternatively, the receiving end receives the DCI information, and according to bit definitions in the DCI information, it firstly determines which mode is adopted for the DCI information to describe the information about time that the unlicensed carrier is occupied, and then determines the information about time that the unlicensed carrier is occupied.

Alternatively, the receiving end includes a base station, a relay station and UE.

Through the solution, the occupation of unlicensed carriers in an LTE system may be realized, current LTE physical channel signaling is continuously used to an utmost extent and thus the influence on the LTE system is minimized.

This alternative embodiment will be described below in more detail.

Basic idea of this preferred embodiment: a sending end uses DCI to describe information about time that an unlicensed carrier is occupied by the sending end or other sending ends, and sends the DCI information. For example, a base station 1 adopts DCI information to describe information about time that the unlicensed carrier is occupied by the base station 1 (e.g., describe how many subframes are occupied or which subframes are occupied), then and sends the information, specifically by using a PDCCH or ePDCCH or a resource which is pre-agreed (or fixed through protocol). For another example, UE subordinate to the base station 1 or a small cell subordinate to the base station 1 receives the DCI information sent by a proximal base station 2 (since a distance between the base station 1 and the base station 2 is long, the DCI information sent by the base station 2 cannot be received through an air interface), and then forwards the DCI information to the base station 1 to which the UE belongs. During specific forwarding, DCI information may be still adopted for sending, or the DCI information is converted into other signaling forms and then is sent to the base station 1, e.g., the DCI information is converted into an RRC message for sending.

A receiving end monitors (or receives and monitors) the DCI information sent by other proximal base stations in the unlicensed carrier to learn about the information about time that the unlicensed carrier is occupied by the proximate base stations, and determines whether to continuously occupy the unlicensed carrier or schedule the subordinate UE according to the information about occupied time. When the receiving end needs to use the unlicensed carrier, the receiving end needs to firstly monitor information for describing occupation of the unlicensed carrier in the DCI signaling of other base stations, and then determine that the unlicensed carrier is not used by other base station or that the unlicensed carrier is used by other base stations but the use of the unlicensed carrier by the receiving end is not influenced (e.g., under a situation that the transmission direction is different).

When the receiving end receives the information about time, forwarded by the subordinate UE or small cell thereof, that the unlicensed carrier is occupied by proximal base stations, the receiving end decides to use a beamforming technology for the UE or small cell to transmit data according to the information about time.

When the receiving end is a base station, the base station respectively performs synchronization at different licensed frequency points, acquires a cell ID of the base station which sends the DCI, receives a PCFICH and receives a PDCCH, or does not receive a PCFICH but directly receives an ePDCCH and acquires the DCI; and if the receiving end is UE, after the UE executes the above-mentioned process, the UE further needs to inform a base station, to which the UE belongs, about the DCI through UCI or the uplink RRC signaling for reference.

If the sending end is a base station, in an alternative mode (first), the base station needs to simultaneously send a PSS/SSS and a PBCH and a demodulation signal CRS (only OFDM symbols bearing a PDCCH domain are sent and other symbols of a PDSCH domain are not sent) or DMRS needed by a PCFICH and a PDCCH or ePDCCH in the unlicensed carrier to enable other base stations to be capable of being synchronized with the unlicensed carrier and demodulate the DCI. In another alternative mode (second), the base station ensures that the unlicensed carrier to be strictly aligned to the licensed carrier of the base station, the base station sends the DCI information in the unlicensed carrier according to timing of the licensed carrier thereof, and thereby the unlicensed carrier can be enabled to have the same frame number and subframe number as the licensed carrier of the base station and the OFDM symbol is also aligned. The PSS/SSS and PBCH do not need to be sent in the unlicensed carrier. If the base station has a plurality of licensed carriers, it is agreed that the base station at least ensures the unlicensed carrier to be strictly aligned to timing of a certain licensed carrier thereof, e.g., an licensed carrier of an agreed minimum frequency point.

If the sending end adopts the first mode, the receiving end needs to receive the PSS/SSS and PBCH of the sending-end base station and then receive PCFICH and PDCCH; or receive the PSS/SSS and PBCH of the sending-end base station and then receive the ePDCCH. If the sending end adopts the second mode, the receiving end needs to be firstly synchronized with the licensed carrier, then determines a location of the DCI sent in the unlicensed carrier according to the timing of the licensed carrier, and then receives the DCI.

The information about time, described by the sending end by using the DCI information, that the unlicensed carrier is occupied by the sending end or other sending ends includes: information about time described by taking a subframe as a unit, information about time described by taking an OFDM symbol as a unit or information about time described by taking a slot as a unit.

Alternatively, when the sending end is a base station, a PDCCH in first one, two, three or four OFDM symbols of a subframe can be used to bear the information about time. For example, the base station can determine the number of OFDM symbols occupied by the PDCCH according to the requirement of the number of scheduled UE. If first two OFDM symbols are determined, the base station sends the PDCCH in the first two OFDM symbols, and simultaneously indicates through a PCFICH channel. Further, the base station needs to send the DCI in a common search space of the PDCCH and uses a common agreed RNTI for scrambling, and thereby other base stations receive the PCFICH, determines the number of the OFDM symbols occupied by the PDCCH and then use the common RNTI to search the DCI in the common search space of the PDCCH (other base stations need to have a capability of searching the PDCCH and the current base station does not need to search the PDCCH).

Alternatively, the DCI information may also be sent through an ePDCCH. For example, it is agreed that (or fixed through protocol) two (or four, or eight) PRBs in the carrier are arranged to send the DCI (or is arranged to send the information about time in the unlicensed carrier for LTE), and the sending is performed through the ePDCCH channel. By adopting the ePDCCH to send the DCI in the agreed resource, the needed overhead is less than the overhead for sending the DCI by using the PDCCH.

Alternatively, whether a next subframe is used by the sending-end base station is indicated in a current subframe. For example, the DCI information sent in a subframe n describes that a subframe n+1 will be occupied. Thereby, when other base stations monitor in the current subframe, if it is found that the information about time of the current subframe is idle, other base stations can use the next subframe.

Alternatively, the sending end uses the DCI to bear the information about time that the unlicensed carrier is occupied by the sending end and other ending end, and it sends the DCI. It may be agreed that a certain DCI format is adopted and bits in the DCI format are used to describe information about a subframe that the unlicensed carrier is occupied by the sending end or other sending ends. Thereby the searching speed of other base stations is accelerated because the DCI format which needs for blind search is reduced to one, other base stations only need to perform the blind search according to this DCI format and other DCI formats do not need to be considered.

Alternatively, DCI formats 3, 3A and 1C are used. Other DCI formats may also be used. In principle, a format to which blind search is easily performed is selected, e.g., a bit number corresponding to this format is unique.

Alternatively, the DCI information is scrambled by using an agreed RNTI, ad it is sent in a common search space of the PDCCH or ePDCCH or sent in an agreed resource.

Alternatively, the information about time is described by taking a subframe as a unit and describes subframes which will be occupied by the sending end or other sending ends. For example, it describes how many continuous subframes starting from a current subframe are occupied; or it describes how many continuous subframes starting from a certain subframe are occupied; or it describes one subframe occupation pattern, and subframes corresponding to the pattern will be occupied.

Alternatively, the described subframes are subframes within an agreed period of time. For example, the total length of time of occupied subframes should not exceed a certain set threshold. For example, maximum occupied time at one time is 10 ms.

Alternatively, the described information about time is a subframe pattern in a time direction. The subframes corresponding to the pattern of subframes are occupied by the sending end or other sending ends.

Alternatively, a use mode of DCI bits is that: if a maximum number of subframes which are allowable to be occupied at one time is N and N is less than or equal to a bit number of DCI, first N bits in DCI may be used to describe subframes (one subframe is 1 ms in LTE), in N ms, occupied by the sending end or other sending ends in a bitmap mode. Other bits are used as reserved bits and still need to be sent (in order to facilitate the blind search by other base stations).

Alternatively, the sending end sends DCI describing the information about time in each subframe in occupied subframes.

Alternatively, if DCI is sent in each subframe, DCI describes that occupied subframe information is remaining and new subframe occupation information. For example, originally the sending end occupies five subframes, the DCI describes that five subframes are occupied in a first subframe, the DCI describes four subframes are occupied in a second subframe and used subframes need to be deducted.

Alternatively, timing of the subframe used by the sending end to send DCI is the same as timing of at least one licensed carrier of the sending end.

Alternatively, the licensed carrier is alternatively a carrier of a minimum frequency point possessed by the sending end.

Alternatively, the sending end sends it in a downlink carrier or an uplink carrier.

Alternatively, when the sending end uses the uplink carrier, it is sent in an uplink resource allocated by a base station thereto.

Alternatively, the sending end may send the DCI information of the occupied unlicensed carrier only in a first subframe which is seized and does not send the DCI information in subframes after the occupied subframe.

Alternatively, bits in the DCI are redefined to: indicate which mode is used for describing the information about time that the unlicensed carrier is occupied in the DCI; describe the information about time that the unlicensed carrier is occupied. For example, the sending end uses a first bit in DCI to describe which mode is used for describing the information about time that the unlicensed carrier is occupied, e.g., adopts a bitmap mode or a mode of a plurality of continuous subframes after an agreed subframe for description; and it uses part of or all bits in remaining bits to describe information about specifically occupied time.

Alternatively, 1 bit may also be set in DCI to indicate a mode which will be adopted by bits in DCI to describe a resource seizure mode, e.g., a bitmap mode or a continuous seizure mode.

Alternatively, 1 bit may also be set in DCI to indicate whether the seized resource is a resource at a current moment or a future moment.

Alternatively, a plurality of bits may also be set in DCI to simultaneously indicate a mode which will be adopted by bits in DCI to describe resource seizure mode and indicate whether the seized resource is a resource at a current moment or a future moment, and other bits are used to describe occupation and release situations.

Alternatively, different common RNTIs are adopted to distinguish whether bits in DCI use the bitmap mode or the continuous resource seizure mode; or different common RNTIs are used to distinguish whether the seized resource is the resource at the current moment or the future moment. For example, a common RNTI is allocated for the bitmap mode of resource seizure and is scrambled in the corresponding DCI using the bitmap mode. A common RNTI is allocated for the continuous resource seizure mode and is scrambled in the corresponding DCI using the continuous resource seizure mode.

Alternatively, the sending end includes a base station, a relay station and UE.

Specific solution of receiving end: (basically reverse to the sending end)

A receiving end receives information about time, described in a subframe OFDM symbol, that an unlicensed carrier is occupied by other base stations, and learns about time that the unlicensed carrier is occupied by other base stations according to the information about time. Herein, the information about time is born by DCI.

Alternatively, the receiving end receives the information about time that the unlicensed carriers are occupied in a PDCCH in first one or two or three or four OFDM symbols of a subframe. Or the DCI is received in the OFDM symbol of the second slot of the subframe. Or the DCI is received in a resource location previously agreed in the subframe.

Alternatively, the receiving end receives the information about time in a PDCCH or an ePDCCH according to an agreed DCI format.

Alternatively, the receiving end parses the meaning of bit according to bits in DCI to determine a location of a subframe of the unlicensed carrier occupied by other base stations. For example, when the sending end uses the bitmap mode to describe the information about the occupied subframes, the receiving end determines which subframes are occupied according to bitmap signaling; or the receiving end receives the DCI information, firstly parses the bit indicating the mode of describing the information about time that the unlicensed carrier is occupied in the DCI, and then parses the bit describing the information about time that the unlicensed carrier is occupied to determine the information about the occupied subframes.

Alternatively, the receiving end receives the DCI or UCI information in an uplink carrier, and the receiving end considers that the DCI or UCI information describes the information about time that the unlicensed carrier is occupied by other base stations proximal to the sending end.

Alternatively, the receiving end needs to monitor the DCI information subframe by subframe and determine a busy/idle state of the unlicensed carrier.

Alternatively, the receiving end receives the DCI information, according to bit definitions in the DCI information, it firstly determines a mode which is adopted for the DCI information to describe the information about time that the unlicensed carrier is occupied, and then determines the information about time that the unlicensed carrier is occupied.

Alternatively, the receiving end includes a base station, a relay station and UE.

Embodiment 1

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

The base station 1 may set first 10 bits of DCI format 3 to be signaling describing information about occupied time, and remaining bits are continuously reserved and sent. When the base station 1 needs to occupy five continuous subframes, the base station 1 sets first five bits of DCI format 3 to be 1, then sets next five bits to be 0 and sets other bits to be zero. DCI information sent in a first occupied subframe is "1111100000", herein a first bit identifies a current subframe, 1 indicates that it is occupied and subsequently four subframes are occupied; DCI information sent in a second occupied subframe is "1111000000", herein a first bit identifies a current subframe, 1 indicates that it is occupied and subsequently three subframes are occupied; DCI information sent in a third occupied subframe is "1110000000", herein a first bit identifies a current subframe, 1 indicates that it is occupied and subsequently two subframes are occupied; DCI information sent in a fourth occupied subframe is "1100000000", herein a first bit identifies a current subframe, 1 indicates that it is occupied and subsequently one subframe is occupied; and DCI information sent in a fifth occupied subframe is "1000000000", herein a first bit identifies a current subframe, 1 indicates that it is occupied and subsequently zero subframe is occupied.

After other base stations receive the DCI signaling of the base station 1, other base stations parse information about a specific subframe that the unlicensed carrier is occupied by the base station 1 according to the agreed meaning of the signaling.

Alternatively, the base station may also send DCI only in first seized subframe. For example, when the base station 1 needs to occupy five continuous subframes, the base station 1 sets first five bits of DCI to be 1, then sets next five bits to be 0 and sets other bits to be zero. DCI information sent in a first occupied subframe is "1111100000", herein a first bit identifies a current subframe, 1 indicates that it is occupied and subsequently four subframes are occupied. The base station 1 does not need to send the DCI information about seizure in next four subframes. Other base stations also only need to receive the DCI information in the first subframe, next four subframes do not need to be monitored any more, and new receiving or seizure is not started until the subframes occupied by the base station 1 are ended.

Embodiment 2

(This embodiment is an example of seizing a resource at a future moment)

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

The base station 1 may set first 10 bits of DCI format 3 to be signaling describing information about occupied time, and remaining bits are continuously reserved and sent. When the base station 1 needs to occupy a 4th subframe (i.e., k+4) starting from a current subframe (kth), the base station 1 sets bits describing information about occupied time in the DCI to be "0000100000". Other base stations receive the DCI information of the base station 1 in a kth subframe, parse the DCI information and may understand it as that the base station 1 sends the DCI information in the kth subframe to seize a (k+4)th subframe resource, and the base station does not occupy the kth subframe. At this moment, the DCI of the base station 1 may also be sent in a non-common search space of a PDCCH or ePDCCH.

For another example, the base station 1 may set first 10 bits of DCI format 3 to be signaling describing information about occupied time, and remaining bits are continuously reserved and sent. When the base station 1 needs to occupy a current subframe (kth) and 4th and 8th subframes thereafter (i.e., k, k+4 and k+8), the base station 1 sets bits describing information about occupied time in the DCI to be "1000100010". Other base stations receive the DCI information of the base station 1 in a kth subframe, parse the DCI information and may understand it as that the base station 1 seizes kth, (k+4)th and (k+8)th subframe resources. At this moment, the DCI of the base station 1 may also be sent in a non-common search space of a PDCCH or ePDCCH.

It may also be considered that more bits are set to describe information about seizure of more subframes in a bitmap mode, and the use principle is similar.

Other base stations receive the DCI information of the base station 1 according to the agreement, e.g., it may performs reception in each subframe or receive it only in the first subframe in which the base station 1 sends the DCI. After other base stations receive the DCI signaling of the base station 1, other base stations parse information about a specific subframe that the unlicensed carrier is occupied by the base station 1 according to the agreed meaning of the signaling.

Embodiment 3

(This embodiment is an example of a continuous resource seizure mode)

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

The base station 1 may set first 10 bits of DCI format 3 to be signaling describing information about occupied time, and remaining bits are continuously reserved and sent. When the base station 1 needs to occupy five continuous subframes, the base station 1 sets first five bits of DCI format 3 to be 1, then sets next five bits to be 0 and sets other bits to be zero. DCI information sent in a first occupied subframe is "1111100000", herein a first bit identifies a current subframe, 1 indicates that it is occupied and subsequently four subframes are occupied; DCI information sent in a second occupied subframe is "1111000000", herein a first bit identifies a current subframe, 1 indicates that it is occupied and subsequently three subframes are occupied; DCI information sent in a third occupied subframe is "1110000000", herein a first bit identifies a current subframe, 1 indicates that it is occupied and subsequently two subframes are occupied; DCI information sent in a fourth occupied subframe is "1111100000", herein a first bit identifies a current subframe, 1 indicates that it is occupied and subsequently one subframe is occupied; and DCI information sent in a fifth occupied subframe is "1111000000", herein a first bit identifies a current subframe, 4 indicates that it is occupied and subsequently zero subframe is occupied. DCI information sent in a first occupied subframe is "1110000000", herein a first bit identifies a current subframe, 1 indicates that it is occupied and subsequently four subframes are occupied. DCI information sent in a first occupied subframe is "1100000000", herein a first bit identifies a current subframe, 1 indicates that it is occupied and subsequently four subframes are occupied. DCI information sent in a first occupied subframe is "1000000000", herein a first bit identifies a current subframe, 1 indicates that it is occupied and subsequently four subframes are occupied.

In this case, it is required that the other base stations receive the DCI information for each subframe occupied by the base station 1 or the last subframe occupied by the base station 1 to receive the DCI information to determine that the base station 1 occupies the unlicensed carrier The Embodiment 4

(This embodiment is an example of a resource seizure mode according to a feedback timing principle)

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

The base station 1 may set first 10 bits of DCI format 3 to be signaling describing information about occupied time, and remaining bits are continuously reserved and sent. For example, the base station 1 needs to occupy one subframe to transmit downlink data and needs to wait for ACK/NACK feedback information of UE after this subframe to transmit it uplink to the base station 1. The base station 1 sets first 10 bits of DCI format 3 to be "1000100000" and then sends it. The base station 1 will occupy a current subframe (k) and a (k+4)th subframe and does not occupy (k+1)th, (k+2)th and (k+3)th subframes which may be seized and used by other base stations. Herein, the kth and (k+4)th subframes are occupied mainly according to a feedback timing principle of ACK/NACK of current LTE (i.e., sending in the kth subframe and feeding back in the (k+4)th subframe). If feedback timing principles of other systems are different, the subframe resources may be occupied according to the corresponding feedback timing principles.

Embodiment 5

(This embodiment is an example of a flexible resource seizure mode according to a transmission situation)

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

The base station 1 may set first 10 bits of DCI format 3 to be signaling describing information about occupied time, and remaining bits are continuously reserved and sent. For example, the base station 1 needs to occupy a subframe to transmit downlink data and needs to wait for ACK/NACK feedback information of UE after this subframe to transmit it uplink to the base station 1 and to perform the possible downlink retransmission. The base station 1 sets first 10 bits of DCI format 3 to be "1000100010" and sends it. The base station 1 will occupy a current subframe (k) and a (k+4)th subframe thereafter to take it as the uplink ACK/NACK feedback of UE, and if UE feedback is NACK, the base station will perform the retransmission in a (k+8)th subframe; and if UE feedback is ACK, the base station will release the (k+8)th subframe. For example, the base station can send DCI information "0000000000" about a resource occupied by the base station 1 in a (k+5)th subframe. Here, the (k+4)th subframe is uplink and thus the base station 1 cannot perform the transmission, and if it is downlink, the base station 1 sends "0000000000" in the (k+4)th subframe.

Example 6

(This embodiment is an embodiment of a mode of occupying and releasing a resource)

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

The base station 1 may set first 10 bits of DCI format 3 to be signaling describing information about occupied time, and remaining bits are continuously reserved and sent. For example, if the base station 1 occupies a plurality of subframes, when the base station 1 finds that some frames may be released during use, the base station 1 can send the DCI signaling of releasing a resource in the last subframe which is occupied and is determined to be used. Specifically, for example, if the base station 1 occupies five continuous subframes and as a result, the base station 1 finds that the base station 1 only needs to use first three subframes and next two subframes may be released, and the base station 1 sends DCI signaling "1111100000" in a first occupied subframe, sends DCI signaling "1111000000" in a second occupied subframe and sends DCI signaling "1000000000" in a third occupied subframe. Specifically, for example, if the base station 1 occupies five continuous subframes and as a result, the base station 1 finds that the base station 1 only needs to use first three subframes and next two subframes may be released, and the base station 1 sends DCI signaling "1111100000" in a first occupied subframe, sends DCI signaling "1111000000" in a second occupied subframe and sends DCI signaling "1000000000" in a third occupied subframe. In this example, the base station 1 sends the release signaling in the third occupied subframe, and the base station 1 may also send the release signaling (e.g., "1100000000") in the second subframe, mainly depending on the moment that the base station 1 finds that the subframes may be released. After other base stations continuously monitor the information about occupation of the unlicensed carrier of the base station 1, other base stations may learn that the base station 1 releases the last two subframes.

Embodiment 7

(This embodiment is an example of a mode of occupying and releasing a resource)

After base station 1 seizes an unlicensed spectrum, the base station 1 sends DCI describing information about a subframe that the unlicensed carrier is occupied in a PDCCH in first two OFDM symbols of a subframe of the unlicensed carrier, and uses an agreed RNTI to scramble the DCI. For example, it is specified to use DCI format 3 to describe information about a subframe occupied by the base station 1 in a bitmap mode. It is supposed that maximum subframes occupied at one time are 10 ms, i.e., 10 subframes.

Two modes of describing information about occupied time are set, herein one is a bitmap mode, which still uses 10 bits of DCI signaling (at this moment 10 bits are from 2nd to 11th bits); and the other is a continuous description mode, e.g., how many continuous subframes starting from a current subframe are occupied is described, at this moment the bit number is determined according to a specific standard situation, and 16 bits may be set (specifically 2nd to 17th bits of DCI signaling), and this mode is more suitable to be implemented by countries which have no restrictions on maximum occupied time of unlicensed carriers for one time. This approach is more suitable for unlicensed carriers that do not have a maximum time-consuming time for national implementation. A first bit of DCI signaling is used for indicating a mode which is adopted to describe the information about occupied time, and it indicates that a bitmap mode is adopted when this bit is set to be 1, and it indicates that a continuous description mode is used when this bit is set to be 0.

The base station 1 occupies five subframes, and the base station 1 sets a first bit of DCI signaling to be 1 and next 2nd to 11th bits to be "1111100000", and sends the DCI signaling in a first occupied subframe. After other base stations receive the DCI signaling, other base stations firstly parse the first bit and then parse subsequent subframes describing the subframe occupation situation according to the meaning of the first bit.

For another example, the base station 1 occupies 30 subframes, and the base station 1 sets a first bit of DCI signaling to be 0 and next 2nd to 17th bits to be "0000, 0000,0001,1110" and sends the DCI signaling in a first occupied subframe. After other base stations receive the DCI signaling, other base stations firstly parse the first bit and then parse subsequent subframes describing the subframe occupation situation according to the meaning of the first bit.

Other base stations need to receive the DCI in each subframe occupied by the base station 1 in order to find whether the base station 1 releases the unlicensed carrier.

In another embodiment, the software is further provided. The software is arranged to execute the above-mentioned embodiments and the technical solutions described in the alternative embodiments.

In another embodiment, a storage medium is further provided, which stores the above software, and includes but is not limited to a disc, a floppy disk, a hard disk, an erasable memory etc.

Apparently, one skilled in the art should understand that all modules or steps of the present disclosure can be implemented by using general computing devices, and can be integrated on a single computing device or be distributed on a network consisting of a plurality of computing devices. Alternatively, they can be implemented by using program codes that can be executed by the computing devices, such that they can be stored in storage devices and can be executed by the computing devices. In addition, under certain circumstances, the illustrated or described steps can be executed according to a sequence different from the sequence described above, or they are respectively manufactured into integrated circuit modules, or a plurality of modules or steps thereof are manufactured into a single integrated circuit module for implementation. Therefore, the present disclosure is not limited to any specific hardware and software combination.

The above description is only alternative embodiments of the present disclosure and is not intended to limit the present disclosure, for those ordinarily skilled in the art, the present disclosure may have various modifications and changes. Any modifications, equivalent replacements and improvements made within the spirit and principle of the present disclosure, should be included within the protection scope of the present disclosure.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each of the modules/units in the above embodiments may be implemented in the form of hardware, for example by means of an integrated circuit, or may be implemented in the form of a software function module, for example by executing a memory stored in a memory Program/instruction to implement its corresponding function. The present disclosure is not limit to any specific form of the combination of the hardware and software.

The embodiments disclosed in the present disclosure are described above, but they are only the preferred embodiments of the present disclosure for understanding the present disclosure easily, and they are not used for limiting the protection scope of the present disclosure. Those skilled in the art can make any modification and change in the implementations and details without departing from the spirit and scope of the present disclosure, but the protection scope of the present disclosure is subject to the scope defined by the appended claims.

What we claim is:

1. A method for sending information, comprising:
    using, at a sending end, an downlink control information DCI information, which will be transmitted through a physical control channel PDCCH, an enhanced physical control channel ePDCCH, or agreed resources, to describe information about time that unlicensed carriers are occupied;
    sending, at the sending end, the DCI information through licensed carriers or the unlicensed carriers,
    wherein the information about time comprises: a starting subframe and the number of subframes which are continuously occupied starting from the starting subframe;
    wherein using, at the sending end, the DCI information to describe the information about time that the unlicensed carriers are occupied, comprising parts or all of following:
    using, at the sending end, a PDCCH in first one or two or three or four OFDM symbols of a subframe to bear the information about time;
    using, at the sending end, a PDCCH in an OFDM symbol of a second slot of a subframe to bear the information about time; and
    using, at the sending end, a preset resource location of a subframe to bear the information about time.

2. The method for sending information according to claim 1, wherein using, at the sending end, the DCI information to describe the information about time that the unlicensed carriers are occupied further comprises at least one of the following:
    using, at the sending end, the DCI information to describe information about time that the unlicensed carriers are occupied by the sending end; and
    using, at the sending end, the DCI information to describe information about time that the unlicensed carriers are occupied by other sending ends;
    the information about time comprising: under a situation that an uplink and a downlink share the same one carrier, downlink sending time occupied by the sending end and uplink receiving time of the sending end; or the information about time comprising the downlink sending time occupied by the sending end only; or the information about time comprising the downlink sending time occupied by the sending end and partial uplink receiving time of the sending end.

3. The method for sending information according to claim 1, wherein using, at the sending end, the DCI information to describe the information about time that the unlicensed carriers are occupied further comprises:
    indicating, by the sending end in a current subframe, whether a next subframe will be used by the sending end.

4. The method for sending information according to claim 1, wherein using, at the sending end, the DCI information to describe the information about time that the unlicensed carriers are occupied further comprises:
    using, at the sending end, the DCI information according to a preset DCI format to bear the information about time that the unlicensed carriers are occupied;
    using, at the sending end, an agreed Radio Network Temporary Identifier, RNTI, to scramble the DCI information, and sending the DCI information in a common search space of a PDCCH/ePDCCH or in an agreed resource;
    the preset DCI format comprises parts of or all of following: DCI format 3, 3A, 1C and DCI format corresponding to a unique bit number.

5. The method for sending information according to claim 1, wherein the information about time is described by taking a subframe as a unit, or described by taking an OFDM symbol as a unit or described by taking a slot as a unit;
    the information about time describing a subframe, an OFDM symbol or a slot which will be occupied by the sending end or other sending ends.

6. The method for sending information according to claim 1, wherein the information about time describing subframes which will be occupied by the sending end or other sending ends comprises parts of or all of the following:
    the information about time describing that a plurality of continuous subframes starting from a current subframe are occupied;
    the information about time describing patterns of subframes which will be occupied.

7. The method for sending information according to claim 1, wherein using, at the sending end, the DCI information to describe the information about time that the unlicensed carrier is occupied, further comprising parts of or all of the following:

sending, at the sending end, the DCI information describing the information about time in a first occupied subframe;

the DCI information describing information about current remaining occupied subframes;

indicating, by the sending end in a current subframe, whether a next subframe will be used by the sending end;

using, at the sending end, all bits or part of bits in the DCI to describe the information about time that the unlicensed carriers are occupied.

8. The method for sending information according to claim 1, wherein the information about time that the unlicensed carriers are occupied further comprises a length of time that the unlicensed carrier is seized by the sending end in order to execute data transmission for one time.

9. An apparatus for sending information located at a sending end, comprising:

a description module arranged to describe information about time that unlicensed carriers are occupied by using an downlink control information DCI information, which will be transmitted through a physical control channel PDCCH, an enhanced physical control channel ePDCCH, or agreed resources;

a sending module arranged to send the DCI information through licensed carriers or the unlicensed carriers;

wherein the information about time comprises: a starting subframe and the number of subframes which are continuously occupied starting from the starting subframe;

wherein the description module using the DCI information to describe the information about time that the unlicensed carriers are occupied comprises parts of or all of the following:

using a PDCCH in first one or two or three or four OFDM symbols of a subframe to bear the information about time;

using a PDCCH in an OFDM symbol of a second slot of a subframe to bear the information about time; and using a preset resource location of a subframe to bear the information about time.

10. The apparatus for sending information according to claim 9, wherein the description module using the DCI information to describe the information about time that the unlicensed carriers are occupied further comprises at least one of the following:

using the DCI information to describe information about time that the unlicensed carriers are occupied by the sending end;

using the DCI information to describe information about time that the unlicensed carriers are occupied by other sending ends;

the information about time comprising: under a situation that an uplink and a downlink share the same one carrier, downlink sending time occupied by the sending end and uplink receiving time of the sending end; or the information about time comprising the downlink sending time occupied by the sending end only; or the information about time comprising the downlink sending time occupied by the sending end and partial uplink receiving time of the sending end.

11. The apparatus for sending information according to claim 9, wherein the description module using the DCI information to describe the information about time that the unlicensed carriers are occupied further comprises:

indicating, in a current subframe, whether a next subframe will be used by the sending end.

12. The apparatus for sending information according to claim 9, wherein the description module using the DCI information to describe the information about time that the unlicensed carriers are occupied further comprises:

using the DCI information according to a preset DCI format to bear the information about time that the unlicensed carriers are occupied;

using an agreed Radio Network Temporary Identifier, RNTI, to scramble the DCI information, and sending the DCI information in a common search space of a PDCCH/ePDCCH or in agreed resources;

the preset DCI format comprising parts of or all of the following: DCI format 3, 3A, 1C and DCI format corresponding to a unique bit number.

13. The apparatus for sending information according to claim 9, wherein the information about time is described by taking a subframe as a unit, or described by taking an OFDM symbol as a unit or described by taking a slot as a unit;

the information about time describing a subframe, an OFDM symbol or a slot which will be occupied by the sending end or other sending ends.

* * * * *